(12) United States Patent
Masuda

(10) Patent No.: US 8,091,173 B2
(45) Date of Patent: Jan. 10, 2012

(54) WIPER APPARATUS

(75) Inventor: Tadashi Masuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 587 days.

(21) Appl. No.: 12/207,807

(22) Filed: Sep. 10, 2008

(65) Prior Publication Data

US 2009/0064441 A1    Mar. 12, 2009

(30) Foreign Application Priority Data

Sep. 11, 2007  (JP) ................. 2007-235622

(51) Int. Cl.
*B60S 1/34* (2006.01)
(52) U.S. Cl. ................................ 15/250.351
(58) Field of Classification Search ............... 15/250.32, 15/250.351, 250.352, 250.21, 250.202
See application file for complete search history.

(56) References Cited

U.S. PATENT DOCUMENTS

| | | | | |
|---|---|---|---|---|
| 2,850,755 A | * | 9/1958 | Deibel .................. | 15/250.34 |
| 2,860,364 A | * | 11/1958 | Krohm .................. | 15/250.34 |
| 3,006,015 A | * | 10/1961 | Zury .................. | 15/257.01 |
| 3,042,955 A | * | 7/1962 | Oishei ................ | 15/250.351 |
| 3,045,272 A | * | 7/1962 | Oishei ................ | 15/250.13 |
| 3,122,770 A | * | 3/1964 | Krohm ................ | 15/250.351 |
| 6,038,728 A | | 3/2000 | Terai et al. | |

FOREIGN PATENT DOCUMENTS

| | | | |
|---|---|---|---|
| CN | 201205905 | | 3/2009 |
| JP | 59-58665 | | 4/1984 |
| JP | 61-098656 | * | 5/1986 |
| JP | 11-043020 | | 2/1999 |
| JP | 2003-291785 | * | 10/2003 |

* cited by examiner

*Primary Examiner* — Gary Graham
(74) *Attorney, Agent, or Firm* — Rankin, Hill & Clark LLP

(57) ABSTRACT

Wiper apparatus for wiping a window glass of a vehicle includes: an arm shank pivotably supported at its proximal end portion on a vehicle near a window glass and having an opening portion opposed to the window glass and an inner space located inwardly of the opening portion; an arm piece mounted to a distal end portion of the arm shank and having a wiper blade attached thereto; and a wind-noise preventing device provided between the arm piece and the proximal end portion of the arm shank and having a portion protruding through the opening portion toward the window glass so as to prevent traveling wind from entering the inner space through the opening portion.

16 Claims, 13 Drawing Sheets

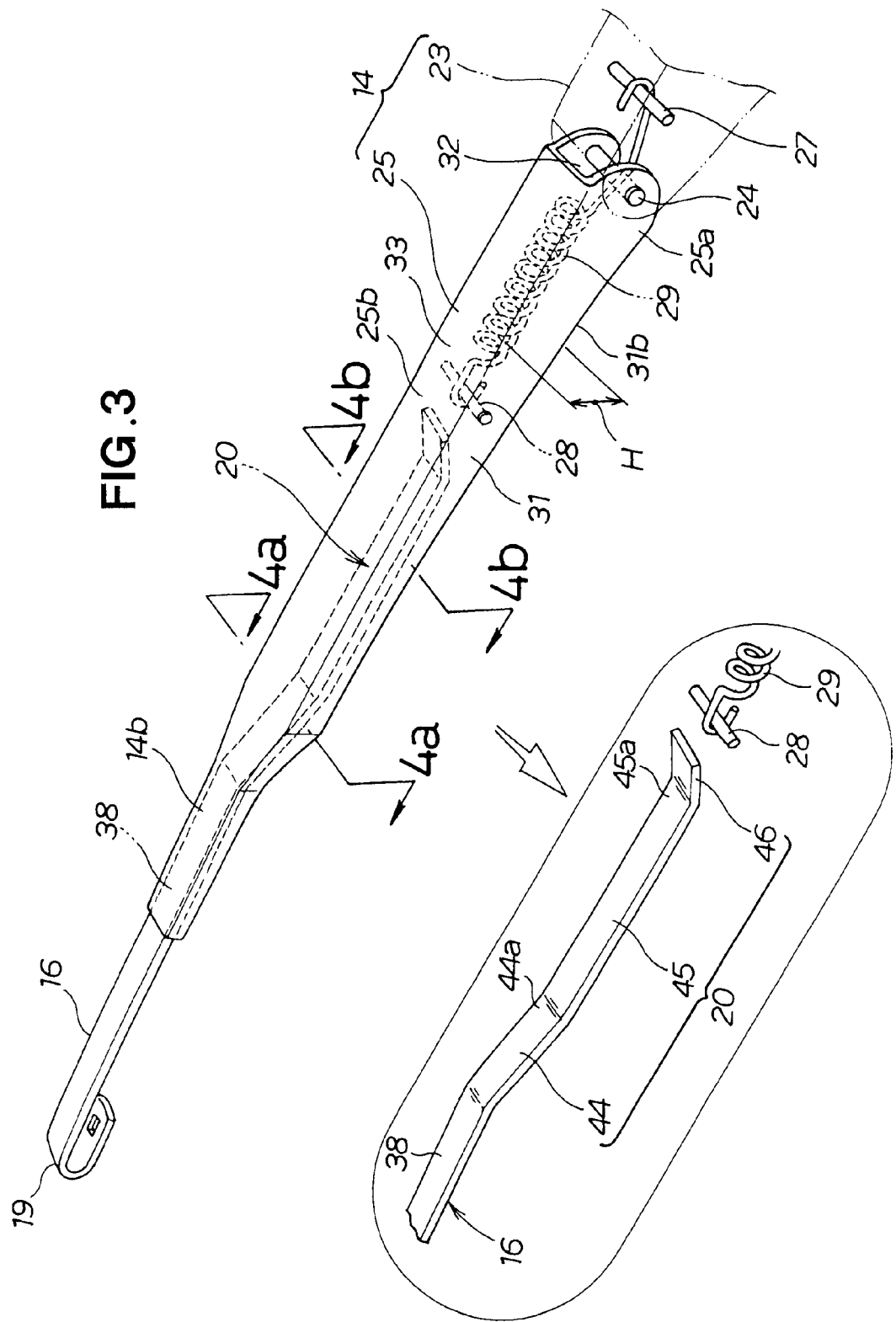

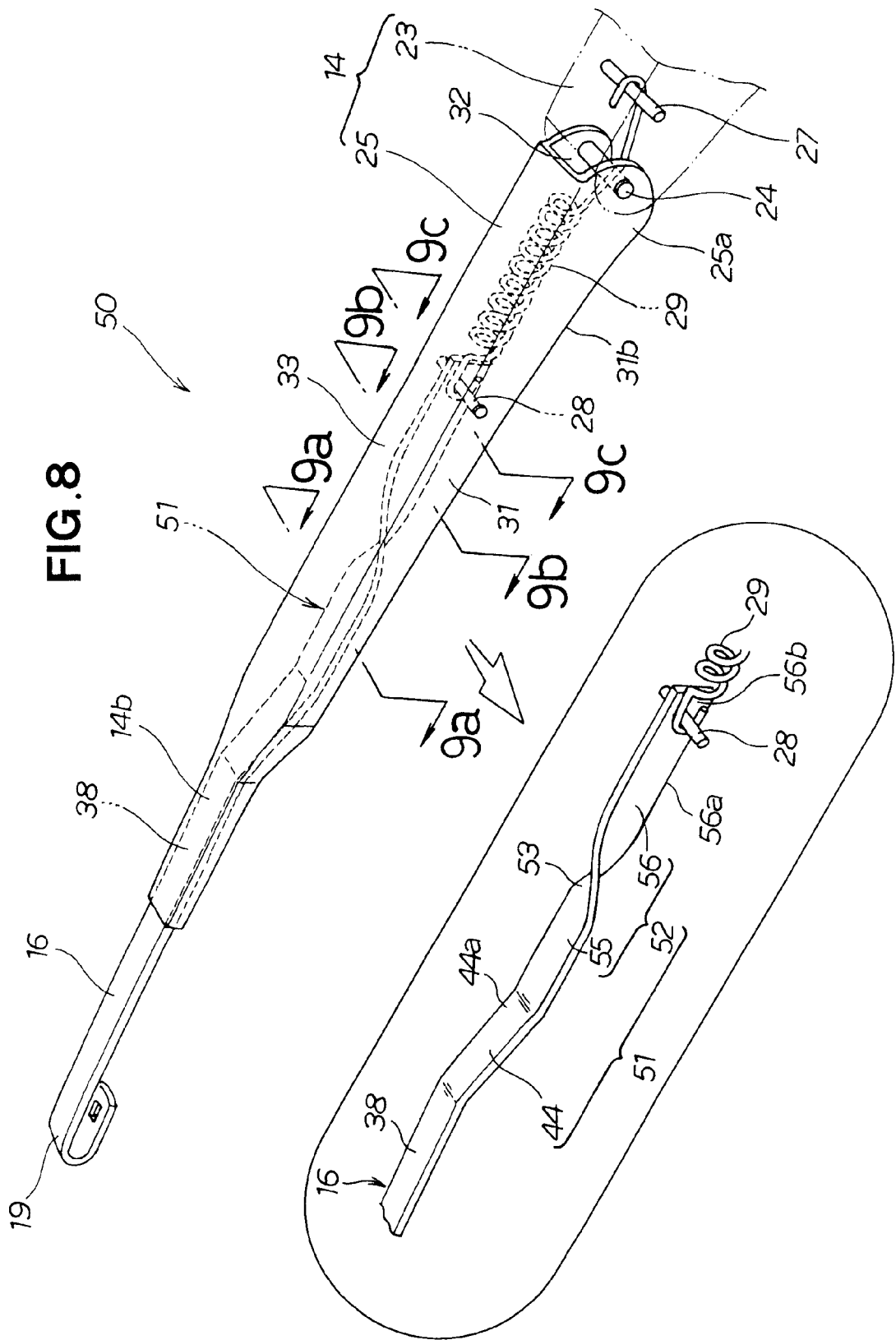

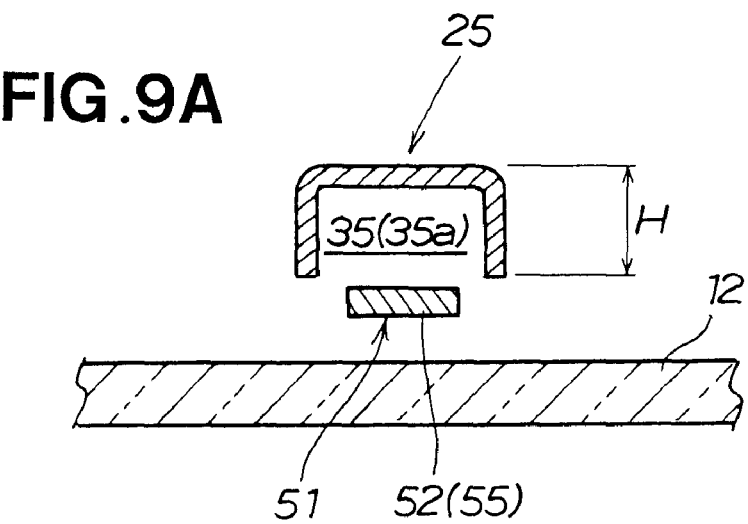
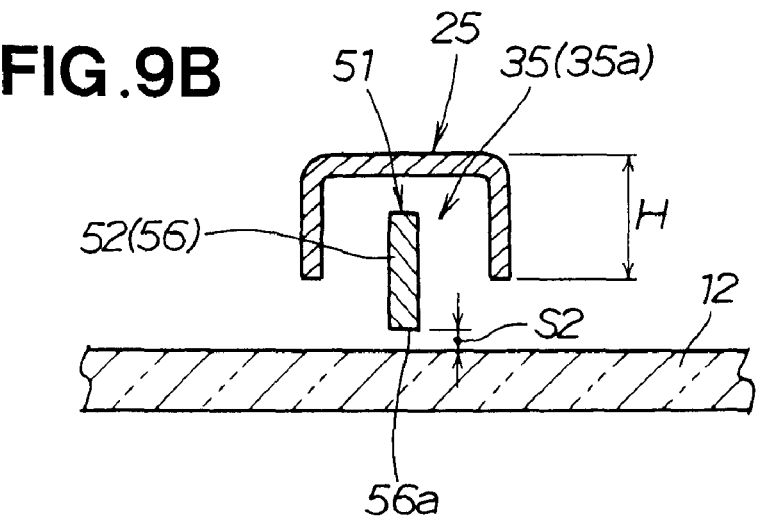
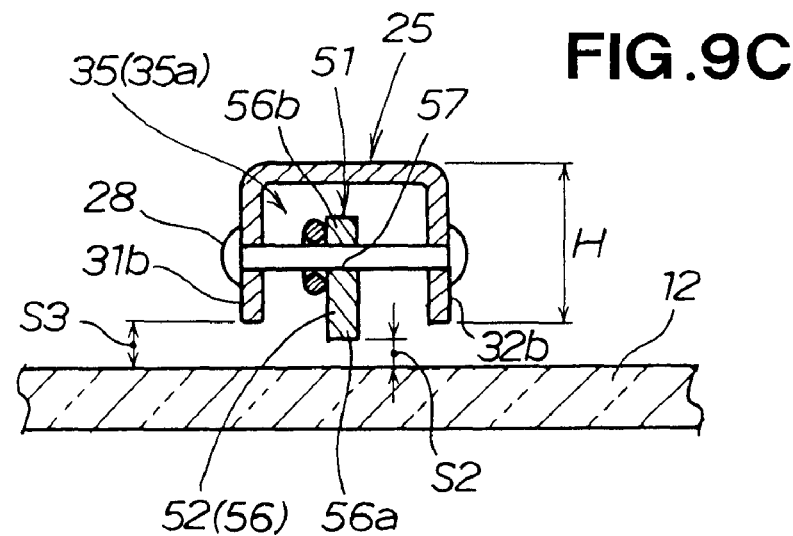

WIPER APPARATUS

FIELD OF THE INVENTION

The present invention relates to wiper apparatus for wiping a vehicular window glass with a wiper blade.

BACKGROUND OF THE INVENTION

In wiper apparatus for vehicles, an arm shank is pivotably supported at its proximal end portion on a vehicle body, an arm piece is attached to a distal end portion of the arm shank, and a wiper blade is mounted to the arm piece. Window glass of the vehicle is wiped with the wiper blade through pivoting movement of the ark shank.

The arm shank has a substantially U sectional shape defined by front and rear side walls and a ceiling or upper wall and thus has an inner space. Air flow produced by traveling of the vehicle (hereinafter referred to as "traveling wind") hits the front wall of the arm shank, so that a turbulent air flow occurs in a space behind the front wall. The turbulent air flow hits the rear wall to produce high-frequency vibrations, which may resonate to produce relatively great air-cutting sound or wind noise.

In Japanese Patent Application Laid-Open Publication No. 11-43020 (JP 11-043020 A), for example, there is proposed a wiper apparatus which is designed to minimize or avoid production of undesired wind noise by forming the rear wall of the arm shank so as to have a lower height than the front wall of the arm shank. For this purpose, the rear wall is formed into a smaller width than the front wall or bent along its longitudinal side edge toward the front wall. With the rear wall of the arm shank having a smaller height than the front wall, the traveling wind can flow smoothly from the front wall toward the rear wall, which can minimize occurrence of a turbulent air flow in a space between the front wall and the rear wall.

However, in the wiper apparatus disclosed in JP 11-043020 A, the arm shank has a complicated shape because the rear wall of the arm shank has be formed into a smaller height than the front wall, which would result in low productivity of the wiper apparatus.

SUMMARY OF THE INVENTION

In view of the foregoing prior art problems, it is an object of the present invention to provide an improved wiper apparatus which can minimize or avoid production of undesired wind noise and simplify the arm shank.

In order to accomplish the above-mentioned object, the present invention provides an improved wiper apparatus for wiping a window glass of a vehicle by means of a wiper blade, which comprises: an arm shank pivotably supported at a proximal end portion thereof on the vehicle near a window glass, the arm shank having an opening portion opposed to the window glass and an inner space located inwardly of the opening portion; an arm piece mounted to a distal end portion of the arm shank and having the wiper blade attached thereto; and a wind-noise preventing device provided between the arm piece and the proximal end portion of the arm shank and having a protrusion portion protruding through the opening portion toward the window glass so as to prevent an air flow, produced by traveling of the vehicle, from entering the inner space through the opening portion.

With the wind-noise preventing device between the arm piece and the proximal end portion of the arm shank and having a protrusion portion protruding through the opening portion toward the window glass, the wiper apparatus of the invention can effectively prevent an air flow (traveling wind), produced by traveling of the vehicle, from entering the inner space through the opening portion and thereby minimize or avoid production of undesired wind noise. Thus, the wiper apparatus of the invention can minimize or avoid production of undesired wind noise, with the simple construction of the wind-noise preventing device provided between the arm piece and the proximal end portion of the arm shank and having a protrusion portion protruding through the opening portion toward the window glass. Thus, unlike in the conventional counterparts, the arm shank need not be formed into a complicated shape and thus can be significantly simplified. With the simplified construction of the wind-noise preventing device and simplification of the arm shank, the wiper apparatus of the present invention can be manufactured with an enhanced productivity In one embodiment, the wind-noise preventing device is provided generally parallel to the window glass. Air flow produced by traveling of the vehicle (traveling wind) runs along the window glass. Thus, the flow of the traveling wind will never be disturbed by the wind-noise preventing device provided generally parallel to the window glass. In this way, the wind-noise preventing device can even more effectively prevent the traveling wind from entering the inner space of the arm shank, to thereby even more effectively minimize or avoid production of undesired wind noise. Further, with the wind-noise preventing device oriented generally parallel to the window glass, it is possible to eliminate adverse influences of a foreign substance, such as snow, caught between the wind-noise preventing device and the window glass.

In one embodiment, the wind-noise preventing device is in the form of an arm piece extension member extending integrally from the arm piece toward the proximal end portion of the arm shank. Because the wind-noise preventing device can be formed integrally with the arm piece, there is no need to provide the wind-noise preventing device as a separate component part. Thus, production of undesired wind noise can be minimized or avoided without an increase in the number of necessary component parts of the wiper apparatus.

In one embodiment, the arm piece extension member (wind-noise preventing device) has a proximal-end-side end portion adjoining the proximal end portion of the arm shank and extending through the opening portion into the inner space. If the wind-noise preventing device is an arm piece extension member extending from the arm piece, it closes only a part of the opening portion, so that traveling wind may undesirably flow into the inner space through another part of the opening portion left unclosed with the wind-noise preventing device. To prevent the traveling wind from flowing into the inner space, the proximal-end-side end portion extends through the opening portion into the inner space to partition off the inner space.

In one embodiment, the proximal-end-side end portion of the arm piece extension member is constructed as a free end portion, so that the proximal-end-side end portion of the arm piece extension member is separated from the arm shank. Thus, the arm piece extension member and arm shank can be painted appropriately with ease if desired, which can effectively prevent corrosion of the arm piece extension member and arm shank.

In one embodiment, the proximal-end-side end portion of the arm piece extension member is fixed at an end thereof within the inner space. Thus, the wind-noise preventing device (arm piece extension member) can be fixed firmly.

In one embodiment, the wind-noise preventing device is an opening-covering member formed separately from the arm shank and the arm piece and attached to the opening portion to cover the opening portion. Because the wind-noise preventing device is provided as a separate component part, it can be manufactured with an increased design (particularly, shape) freedom. Thus, it can be formed so as to cover the entire opening portion. With the opening portion covered or hidden with the opening-covering member (wind-noise preventing device), the wiper apparatus can have an improved appearance as viewed from the interior of the compartment of the vehicle.

Preferably, the opening-covering member is an elastically deformable member, so that it can be readily attached to the opening portion by just being elastically deformed into a shape suitable for attachment.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIG. 3 is a perspective view showing a wind-noise preventing device employed in the first embodiment of the wiper apparatus;

FIG. 8 is a perspective view showing a wind-noise preventing device 6 employed in a second embodiment of the wiper apparatus of the present invention;

FIG. 9A is a sectional view taken along line 9a-9a of FIG. 8, FIG. 9B is a sectional view taken along line 9b-9b of FIG. 8, and FIG. 9C is a sectional view taken along line 9c-9c of FIG. 8;

DETAILED DESCRIPTION OF THE PREFERRED EMBODIMENTS

Figure 1:
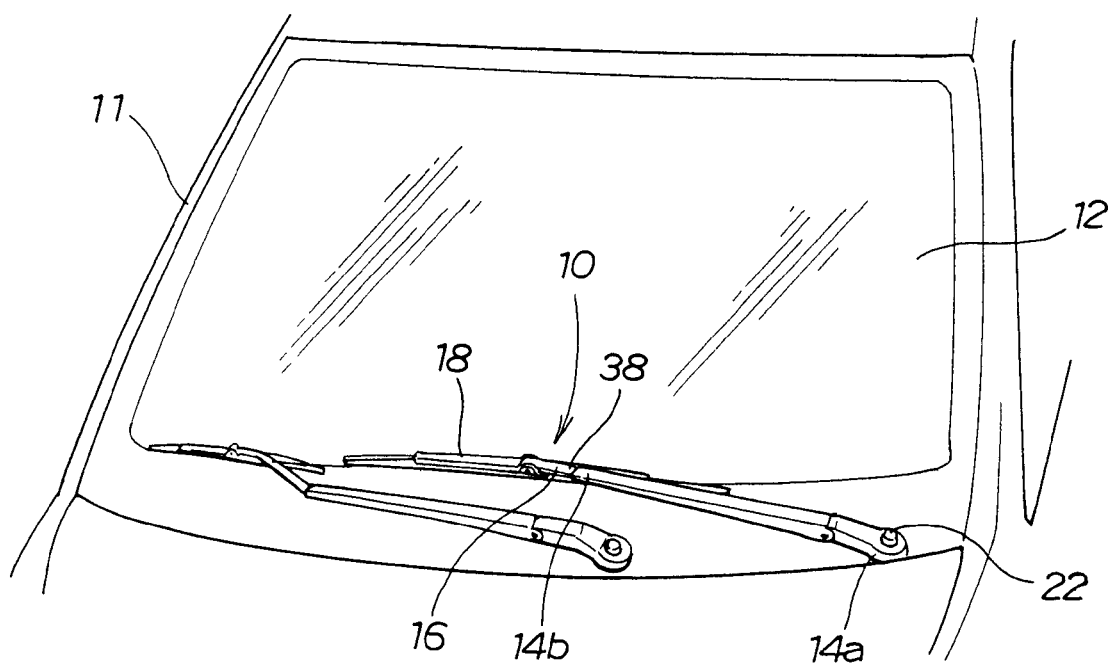
FIG. 1 is a perspective view showing a vehicle provided with a first embodiment of a wiper apparatus of the present invention.
Figure 2:
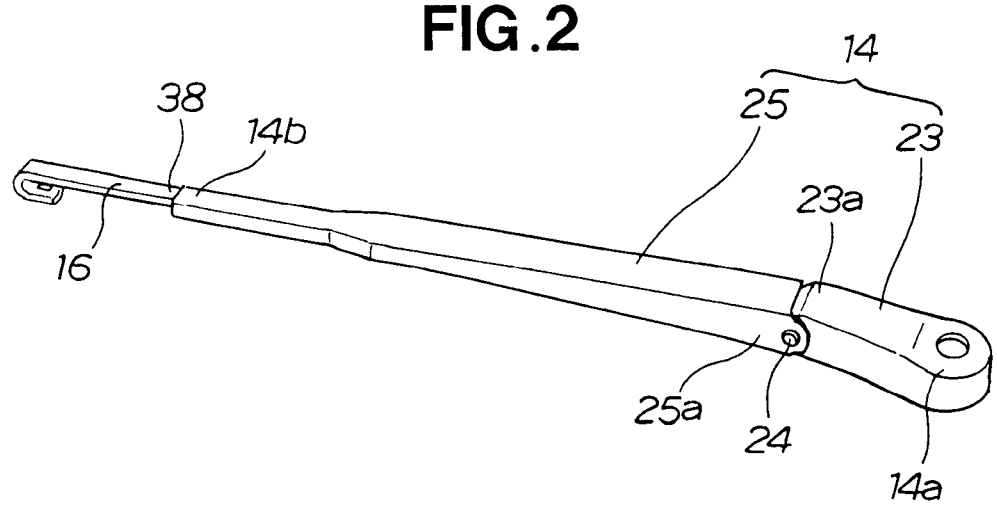
FIG. 2 is a perspective view showing the first embodiment of the wiper apparatus with a wiper blade removed therefrom.

Reference is now made to FIG. 1 showing in perspective a vehicle 11 provided with a first embodiment of a wiper apparatus 10 of the present invention, and to FIG. 2 showing in perspective the wiper apparatus with a wiper blade removed therefrom. The wiper apparatus 10 is provided near a front window glass 12 of the vehicle 11 to wipe the front window glass 12.

The wiper apparatus 10 includes an arm shank 14 pivotably supported at its proximal end portion 14a by the vehicle 11, an arm piece 16 mounted to a distal end portion 14b of the arm shank 14, a wiper blade 18 attached to the arm piece 16, and a wind noise preventing device 20 which is in the form of an arm piece extension member in the instant embodiment (see FIG. 3).

The arm shank 14 includes a head 23 having the proximal end portion 14a pivotably supported on the vehicle 11 by means of a bolt 22, and a retainer 25 connected to a distal end portion 23a of the head 23 by means of a connection pin 24. The head 23 is pivotable about the bolt 22 along the front window glass 12. The retainer 25 is connected at its proximal end portion 25a to the head 23 by means of the connection pin 24 in such a manner that it is pivotable generally vertically in a direction perpendicular to the front window glass 12.

Figure 4A:
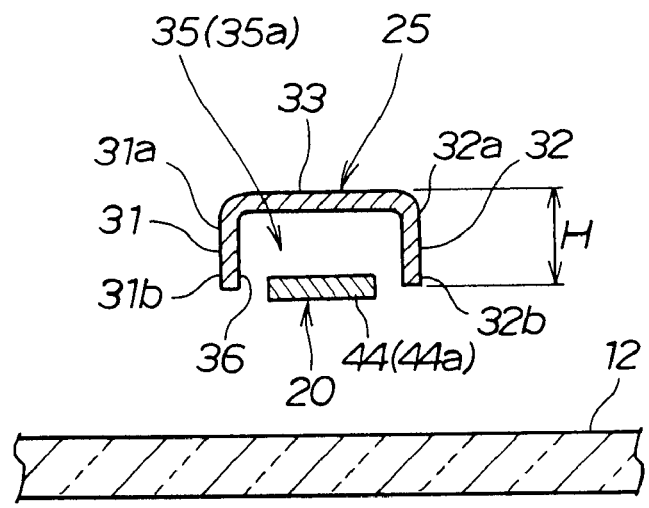
FIG. 4A is a sectional view taken along line 4a-4a of FIG. 3.

FIG. 3 is a perspective view showing the wind-noise preventing device (arm piece extension member) 20 employed in the first embodiment of the wiper apparatus of the present invention. FIG. 4A is a sectional view taken along the 4a-4a line of FIG. 3, and FIG. 4B is a sectional view taken along the 4b-4b line of FIG. 3.

As shown in FIG. 3, the arm shank 14 has a tension spring 29 extending between and fixed at its opposite ends to a pin 27 of the head 23 and a pin 28 of the retainer 25, and the retainer 25 is normally urged by the tension spring 29 toward the front window glass 12. Thus, through pivoting movement of the arm shank 14 about the bolt 22 (FIG. 1), the wiper blade 18 (FIG. 1) can be moved along the front window glass 12 to wipe the window glass 12.

Figure 4B:
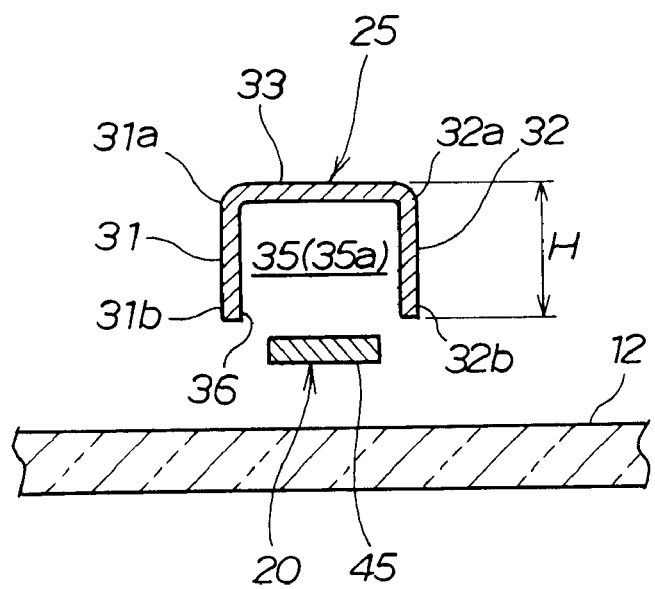
FIG. 4B is a sectional view taken along line 4b-4b of FIG. 3.

As shown in FIGS. 4A and 4B, the retainer 25 has a substantially U 6 sectional shape defined by a front side wall 31 facing away from the front window glass 12, a rear side wall 32 facing toward the front window glass 12a and a ceiling or upper wall 33 interconnecting the front and rear side walls 31 and 32.

The front and rear side walls 31 and 32 extend in parallel and are spaced from each other at a predetermined interval, and these side walls 31 and 32 are positioned substantially vertically with respect to the front window glass 12. In the instant embodiment of the invention, the front and rear side walls 31 and 32 have a same shape and same height H. The upper wall 33 interconnects respective upper edges 31a and 32a of the front and rear side walls 31 and 32 and extends in substantial parallel relation to the window glass 12.

With the retainer 25 formed into the substantially U sectional shape defined by the front and rear side walls 31 and 32 and upper wall 33, the retainer 25 has an opening portion 36 defined by respective lower edges 31b and 32b of the front and rear side walls 31 and 32, and an inner space 35 located inwardly of the opening portion 36. The opening portion 36 are opposed to, or opens toward, the window glass 12 so that the inner space 35 are opposed to the window glass 12.

As shown in FIG. 3, the height H of each of the front and rear side walls 31 and 32 gradually decreases from the proximal end portion 25a toward the distal end portion 14b of the arm shank 14 (retainer 25) in such a manner that the lower edge 31b of the front side wall 31 and lower edge 32b of the rear side wall 32 are held in proximity to the front window glass 12 in a region between the proximal end portion 25a and middle portion 25b of the retainer 25.

Fixation portion 38 is provided at one end of the arm piece 16 and mounted to the distal end portion 14b of the retainer 25. Thus, the arm piece 16 projects straight from the distal end portion 14b of the retainer 25 along the front window glass 12, and it has a distal end portion 19 bent toward the front window glass 12. The wiper blade 18 (see FIG. 1) is attached to the bent distal end portion 19 of the arm piece 16, as in the conventionally-known wiper apparatus.

Figure 5:
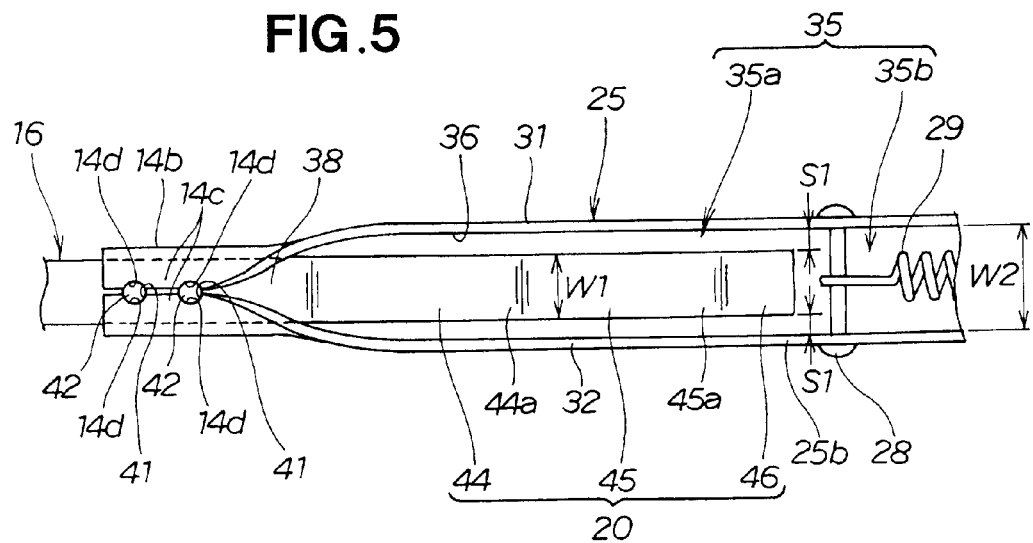
FIG. 5 is a bottom plan view showing the first embodiment of the wiper apparatus of the invention as viewed from a front window glass.
Figure 6:
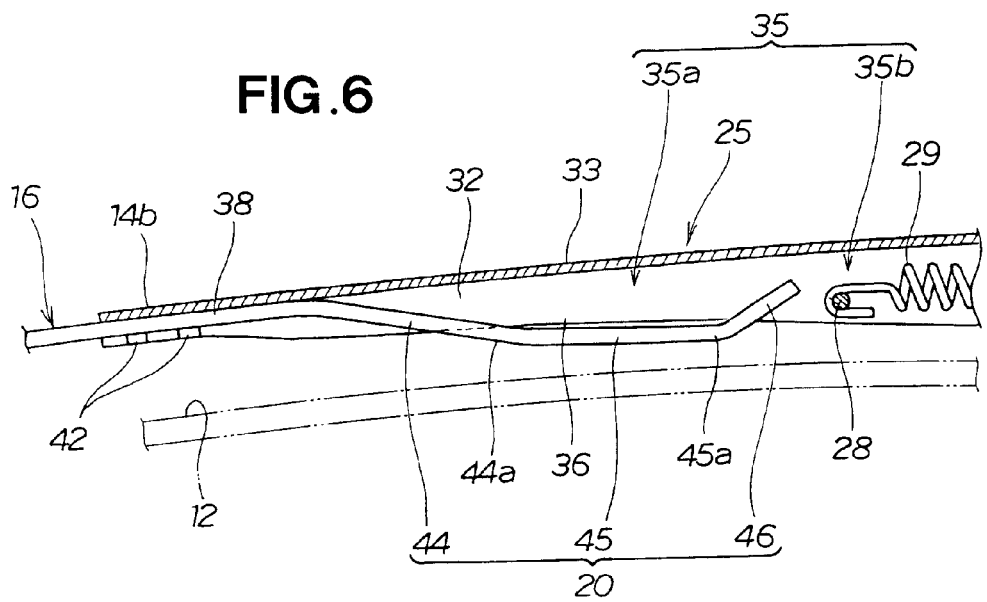
FIG. 6 is a sectional view showing the first embodiment of the wiper apparatus.

FIG. 5 is a bottom plan view showing the first embodiment of the wiper apparatus of the invention as viewed from the front window glass 12, and FIG. 6 is a sectional view showing the first embodiment of the wiper apparatus. As shown, the distal end portion 14b of the retainer 25 is squeezed or pressed so that the fixation portion 38 of the arm piece 16 is tightly wrapped in the distal end portion 14b. Namely, the fixation portion 38 of the arm piece 16 is swaged into the distal end portion 14b.

A pair of opposed recesses 14d are formed in opposed longitudinal side edges 14c of the distal end portion 14b. The opposed recesses 14d together constitute a fitting hole 41 with the distal end portion 14b of the retainer 25 squeezed or pressed in the aforementioned manner. Locking pin 42 is fitted in the fitting hole 41 so that the fixation portion 38 of the arm piece 16 is retained by the distal end portion even more firmly by means of the locking pin 42.

In the first embodiment, the wind-noise preventing device 20 is in the form of an arm piece extension member formed integrally with the fixation portion 38 of the arm piece 16 so as to extend from the fixation portion 38 toward the proximal end portion 25a of the retainer 25.

The wind-noise preventing device 20 has a width W1 smaller than a distance W2 between the front and rear side walls 31 and 32. Gap S1 between the wind-noise preventing device 20 and the front side wall 31 and a gap S1 between the wind-noise preventing device 20 and the rear side wall 32 are set such that it is difficult for an air flow produced by traveling of the vehicle 11 (i.e., "traveling wind") to enter the gaps S1.

As shown in FIG. 6, the wind-noise preventing device (arm piece extension member) 20 has a downward slanting portion 44 extending from the fixation portion 38 (one end of the arm piece 16), a horizontal portion 45 extending from one end of the downward slanting portion 44 to protrude through the opening portion 36 toward the front window glass 12, and an upward slanting portion 46 extending from one end (i.e., end closer to the proximal end portion 14a) of the horizontal portion 45 into the inner space 35. Because the wind-noise preventing device 20 is formed integrally with the arm piece 16, there is no need to provide a separate component part as the wind-noise preventing device 20. Thus, the wind-noise preventing device 20 can be provided without increasing the number of necessary component parts of the wiper apparatus 10.

The downward slanting portion 44 extends downward from the fixation portion 38 of the arm piece 16 to a position beyond the lower end of the opening portion 36. Namely, the downward slanting portion 44 has its lower end 44a protruding through the lower end of the opening portion 36 toward the front window glass 12. In the sectional view of FIG. 4A taken in a substantial front-rear direction of the vehicle body (i.e., in a substantial flowing direction of traveling wind), the downward slanting portion 44 has a width oriented generally parallel to the front window glass 12.

The horizontal portion 45 extends substantially horizontally from the lower end 44a of the downward slanting portion 44 along the front window glass 12, and it protrudes through the lower end of the opening portion 36 toward the front window glass 12. In the sectional view of FIG. 4B taken in the substantial front-rear direction of the vehicle body (i.e., in the flowing direction of traveling wind), the horizontal portion 45 has a width generally parallel to the front window glass 12.

Further, the upward slanting portion 46 extends upwardly from the end 45a (which projects outwardly downward from the opening portion 36 toward the front window glass 12) of the horizontal portion 45 into the inner space 35. In the substantial front-rear direction of the vehicle body (i.e., in the substantial flowing direction of traveling wind), the upward slanting portion 46 also has a width oriented generally parallel to the front window glass 12. By extending through the opening portion 36 into the inner space 35, the upward slanting portion 46 partitions off the inner space 35 into a distal-end-side space 35a and a proximal-end-side space 35b.

The proximal-end-side space 35b is a space lying between the proximal end portion 25a and middle portion 25b of the retainer 25. As noted above, the lower edge 31b of the front side wall 31 and lower edge 32b of the rear side wall 32 are held in proximity to the front window glass 12 in the region between the proximal end portion 25a and middle portion 25b of the retainer 25. Therefore, there is no possibility of traveling wind entering the proximal-end-side space 35b through the opening portion 36, and thus, there is no need to provide the wind-noise preventing device (arm piece extension member) 20 in the region between the proximal end portion 25a and middle portion 25b of the retainer 25.

Because the wind-noise preventing device 20 only need to have the downward slanting portion 44, horizontal portion 45 and upward slanting portion 46, it can be significantly simplified in construction.

Further, the opening portion 36 can be covered with the downward slanting portion 44, horizontal portion 45 and upward slanting portion 46 of the wind-noise preventing device 20. Thus, the wind-noise preventing device 20 can effectively prevent traveling wind from entering the distal-end-side space 35a through the opening portion 36.

Furthermore, in the substantial front-rear direction of the vehicle body (i.e., in the substantial flowing direction of traveling wind), the wind-noise preventing device 20 has its width oriented generally parallel to the front window glass 12. Thus, traveling wind is directed to flow along the front window glass 12. Namely, the wind-noise preventing device 20 can be positioned substantially parallel to the flowing direction of traveling wind, so that the flow of traveling wind can be prevented from being disturbed by the wind-noise preventing device 20.

The upward slanting portion 46 is a free end portion of the wind-noise preventing device (arm piece extension member) 20 held out of contact with the retainer 25. Thus, the upward slanting portion 46 (and even the almost entire arm piece extension member 20) and the retainer 25 can be painted appropriately if desired, to prevent corrosion.

Figure 7A:
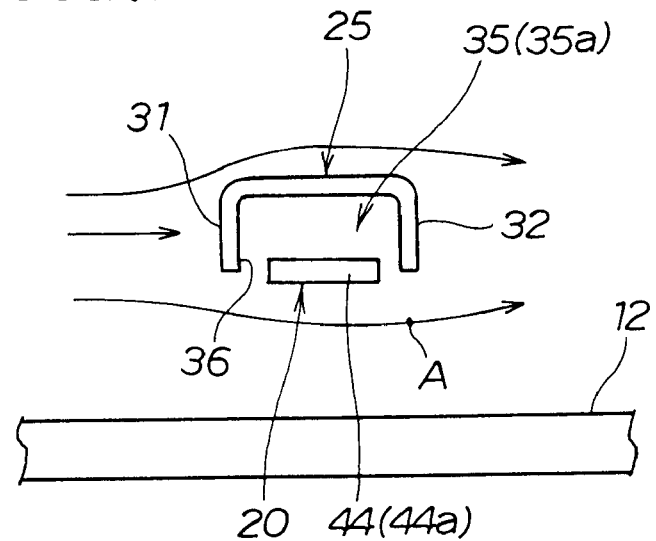
FIGS. 7A-7B are views explanatory of how the wind-noise preventing device functions to minimize or avoid production of wind noise in the first embodiment of the wiper apparatus.
Figure 7B:
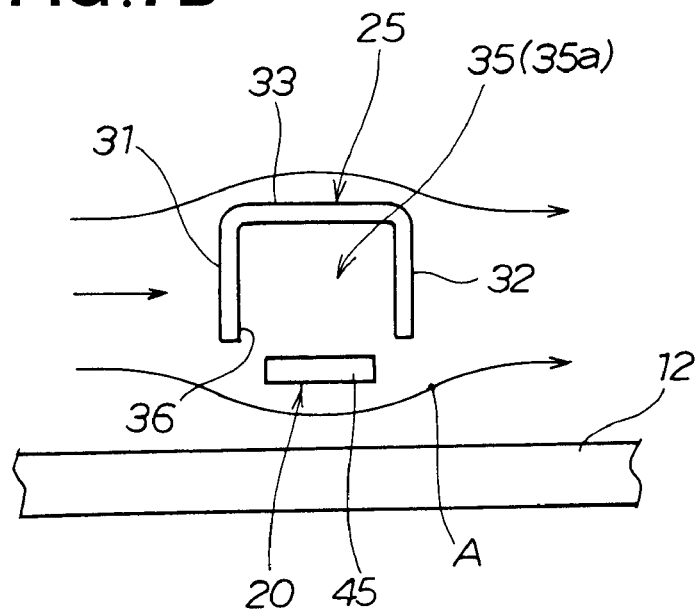

With reference to FIGS. 7A and 7B, the following paragraphs describe how the wind-noise preventing device 20 functions to minimize or avoid production of undesired wind-cutting sound or wind noise. Traveling wind produced by traveling of the vehicle flows along the front window glass 12. Some component of the traveling wind, flowing along the front window glass 12, reaches the front side wall 31 of the retainer 25.

As noted above, the wind-noise preventing device 20 of a simplified construction is disposed in the opening portion 36 of the retainer 25 in such a manner that the portion 45 of the wind-noise preventing device 20 protrudes through the wind-noise preventing device 20 toward the front window glass 12. Thus, the traveling wind flows along the wind-noise preventing device 20 as indicated by arrow A while being effectively prevented, by the protruding 6 wind-noise preventing device 20, from entering the distal-end-side space 35a through the opening portion 36. By the traveling wind being prevented by the wind-noise preventing device 20 from entering the distal-end-side space 35a, the wind-noise preventing device 20 can minimize or avoid production of undesired wind noise.

Because the wind-noise preventing device 20 is positioned generally parallel to the flowing direction of the traveling wind, the flow of the traveling wind can be prevented from being disturbed by the presence of the wind-noise preventing device 20. In this way, the wind-noise preventing device 20 can even more effectively prevent the traveling wind from entering the distal-end-side space 35a, to thereby even more effectively minimize or avoid production of undesired wind noise.

Further, with the wind-noise preventing device 20 oriented generally parallel to the front window glass 12, it is possible to minimize or eliminate adverse influences of a foreign substance, such as snow, having entered between the wind-noise preventing device 20 and the front window glass 12.

In addition, because the upward slanting portion 46 extends upwardly through the opening portion 36 into the inner space 35 to thereby partition off the inner space 35 into the distal-end-side space 35a and proximal-end-side space 35b, the wind-noise preventing device 20 can even more effectively prevent the traveling wind from entering the distal-end-side space 35a, to thereby even more effectively minimize or avoid production of undesired wind noise.

With the simple construction of the wind-noise preventing device 20 merely provided between the arm piece and the proximal end portion of the arm shank and having the protrusion portion protruding through the opening portion 36 toward the front window glass 12, it is possible to effectively minimize or avoid production of undesired wind noise. Thus, there is no need to form the retainer 25 (arm shank 14) into a complicated shape as was necessary in the prior art, so that the first embodiment of the present invention can significantly simplify the arm shank 14. With the simplified construction of the wind-noise preventing device 20 and simplification of the arm shank 14, the first embodiment of the wiper apparatus 10 can be manufactured with an enhanced productivity.

Next, with reference to FIGS. 8-16, a description will be given about second to fourth embodiments of the wiper apparatus of the present invention. Similar elements to those in the first embodiment of the wiper apparatus 10 are indicated by the same reference numerals and characters as used for the first embodiment and will not be described here to avoid unnecessary duplication.

FIG. 8 is a perspective view showing a wind-noise preventing device 51 employed in the second embodiment of the wiper apparatus 50 of the present invention. FIG. 9A is a sectional view taken along the 9a-9a line of FIG. 8, FIG. 9B is a sectional view taken along the 9b-9b line of FIG. 8, and FIG. 9C is a sectional view taken along the 9c-9c line of FIG. 8.

The second embodiment of the wiper apparatus 50 is similar in construction to the first embodiment of the wiper apparatus 10, except that the wind-noise preventing device 51 is employed in place of the wind-noise preventing device 20 of the first embodiment.

Similarly to the wind-noise preventing device 20 of the first embodiment, the wind-noise preventing device 51 is formed integrally with the fixation portion 38 of the arm piece 16 to extend from the fixation portion 38 toward the proximal end portion 25a of the retainer 25.

The wind-noise preventing device 51 has a downward slanting portion 44 extending from the fixation portion 38 (i.e., one end of the arm piece 16), and a horizontal portion 52 extending from one end of the downward slanting portion 44 and protruding through the lower end of the opening portion 36 toward the front window glass 12 (see FIG. 9A).

The horizontal portion 52 is twisted about 45 degrees in its middle region 53, to provide a downward-slant-side part 55 adjoining the downward slanting portion 44 and a pin-side part (proximal-end-side portion) 56 adjoining the pin 28 (and proximal end portion 14a). In the substantial front-rear direction of the vehicle body (i.e., in the substantial flowing direction of traveling wind), the downward-slant-side part 55 has a width oriented generally parallel to the front window glass 12 while the pin-side part 56 has a width oriented generally vertical to the front window glass 12.

The downward-slant-side part 55 extends generally parallel to the front window glass 12 from the lower end 44a of the downward slanting portion 44 and protrudes through the lower end of the opening portion 36 toward the front window glass 12 (see FIG. 9A). The pin-side part 56 protrudes through the lower end of the opening portion 36 toward the front window glass 12.

Lower end 56a of the wind-noise preventing device 51 is held in proximity to the front window glass 12 (see FIG. 9B), and thus, there is no possibility of traveling wind flowing through a gap S2 between the lower end 56a and the front window glass 12. The pin-side part 56 of the wind-noise preventing device 51 has a mounting hole 57 formed in an upper end portion 56b, and the pin 28 is fitted through the mounting hole 57, as seen in FIG. 9C.

Namely, the upper end portion 56b of the pin-side part 56 is fixed by means of the pin 28 within the space 35 of the retainer 25, so that the wind-noise preventing device 51 can be fixed in place firmly.

Figure 10A:
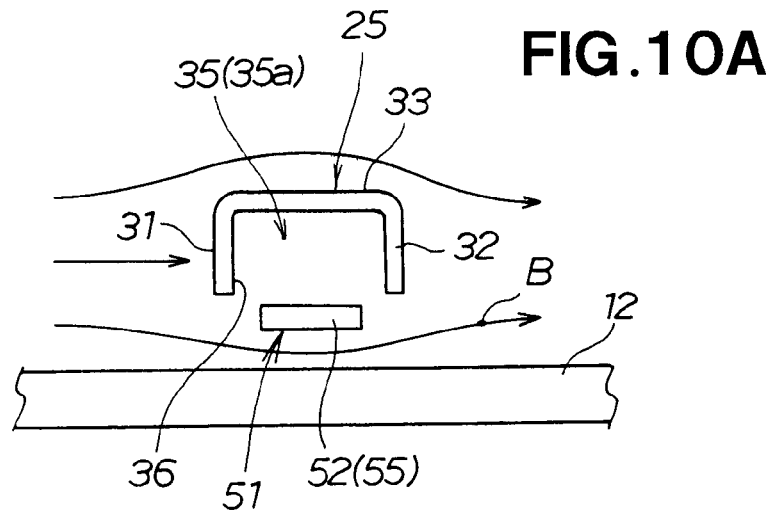
FIGS. 10A-10C are views illustrating how the wind-noise preventing device functions to minimize or avoid production of wind noise in the second embodiment of the wiper apparatus.
Figure 10B:
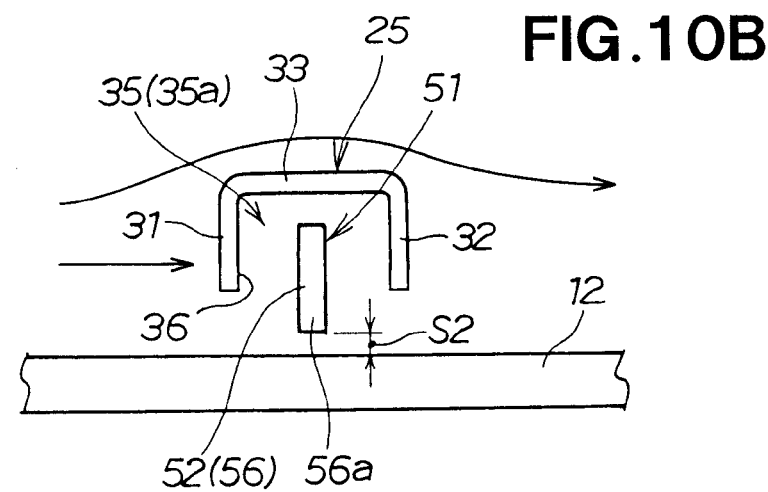
Figure 10C:
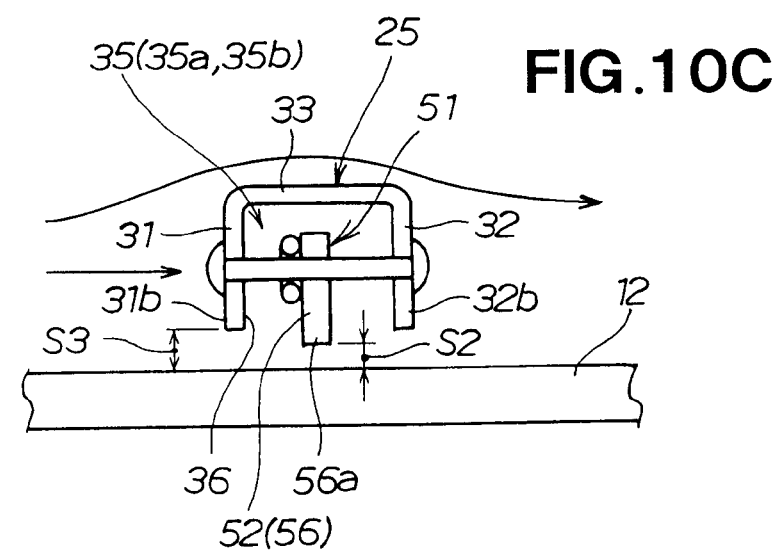

With reference to FIGS. 10A to 10C, the following paragraphs describe how the wind-noise preventing device 51 functions to minimize or avoid production of undesired wind noise. Traveling wind produced by traveling of the vehicle flows along the front window glass 12. Some component of the traveling wind, flowing along the front window glass 12, reaches the front side wall 31 of the retainer 25.

As shown in FIG. 10A, the downward-slant-side part 55, adjoining the downward slanting portion 44, protrudes through the lower end of the opening portion 36 toward the front window glass 12. Thus, the traveling wind flows along the downward-slant-side part 55 as indicated by arrow B while being effectively prevented, by the protruding downward-slant-side part 55, from entering the distal-end-side space 35a through the opening portion 36. By the traveling wind being prevented from entering the distal-end-side space 35a like this, the wind-noise preventing device 51 can minimize or avoid production of undesired wind noise.

Further, as shown in FIG. 10B, the lower end 56a of the side part 56 adjoining the pin 28 is held in proximity to the front window glass 12, so that there is no possibility of the traveling wind flowing through the gap S2 between the lower end 56*a* and the front window glass 12. Thus preventing the traveling wind from entering the distal-end-side space 35*a* can minimize or avoid production of undesired wind noise.

Further, as shown in FIG. 10C, the lower edge 31*b* of the front side wall 31 and lower edge 32*b* of the rear side wall 32 are held in proximity to the front window glass 12 in the middle portion 25*b* of the retainer 25, so that there is no possibility of the traveling wind flowing through a gap S3 between the lower end 56*a* and the front window glass 12. Thus, it is possible to prevent the traveling wind from entering the distal-end-side space 35*a* and proximal-end-side space 35*b* and thereby minimize or avoid production of undesired wind noise.

In the above-described second embodiment of the wiper apparatus 50, where the upper end portion 56*b* of the pin-side part 56 is fixed in place within the space 35, the wind-noise preventing device 51 can be fixed firmly. In addition, the second embodiment of the wiper apparatus 50 can afford the same advantageous benefits as the first embodiment of the wiper apparatus 10.

Figure 11:
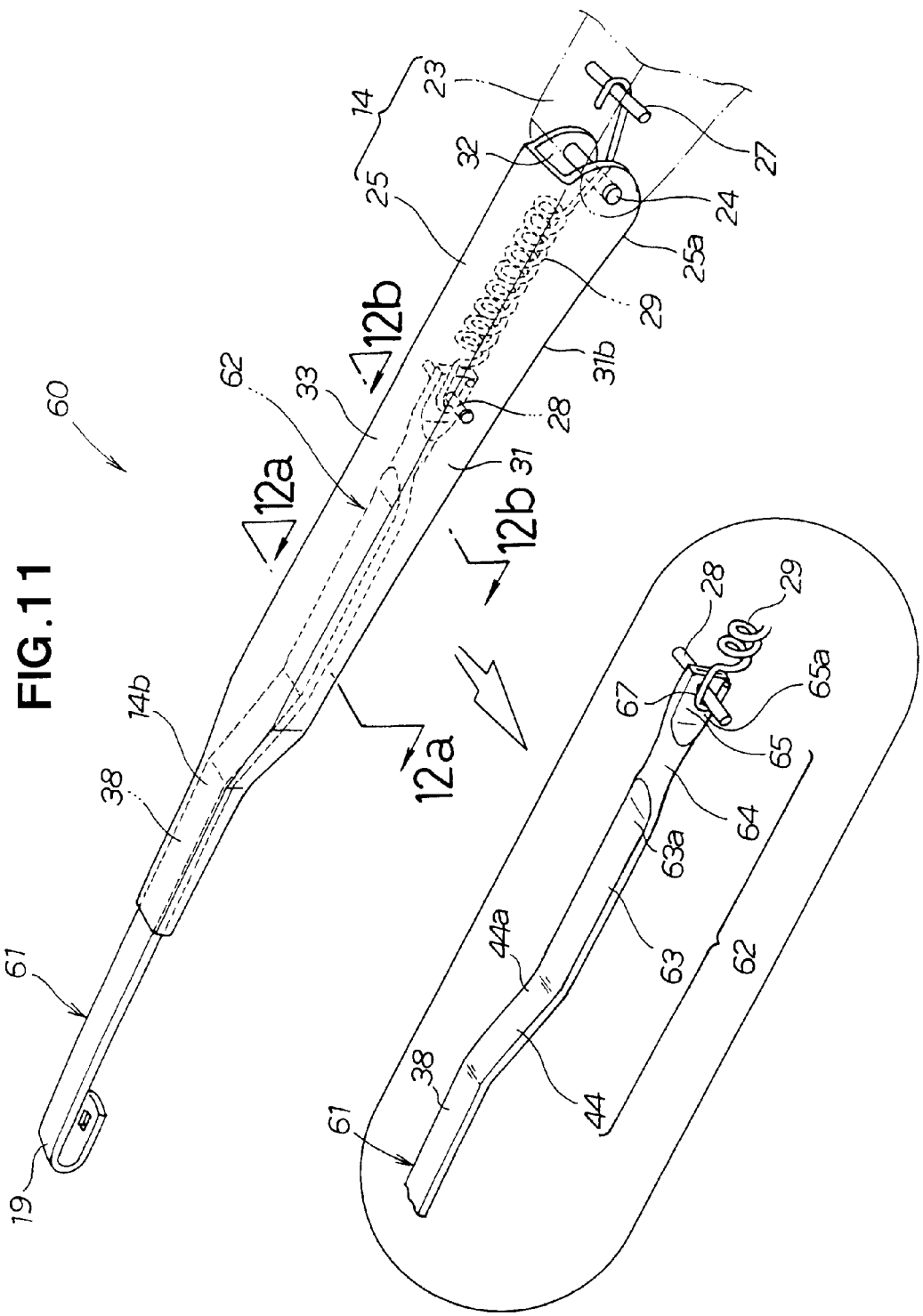
FIG. 11 is a perspective view showing a wind-noise preventing device (arm piece extension member) employed in a third embodiment of the wiper apparatus of the present invention.
Figure 12A:
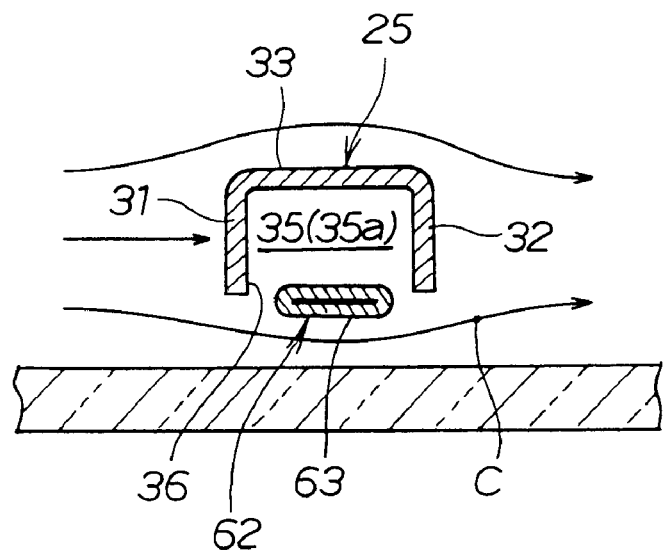
FIG. 12A is a sectional view taken along line 12a-12a of FIG. 11.
Figure 12B:
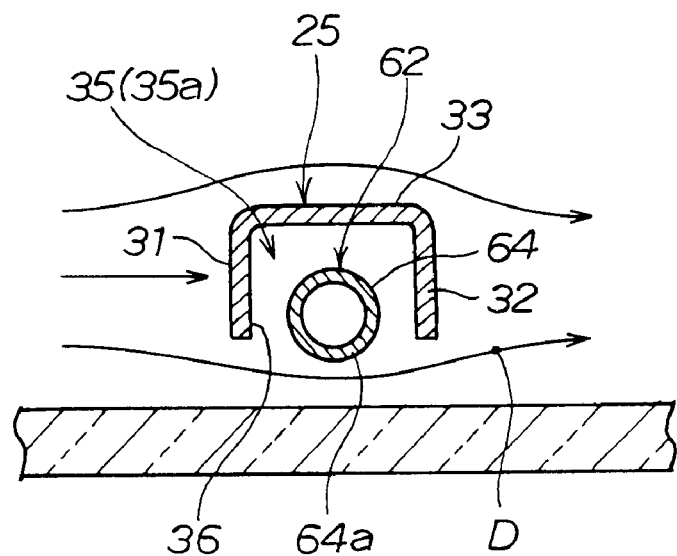
FIG. 12B is a sectional view taken along line 12b-12b of FIG. 11.

FIG. 11 is a perspective view showing a wind-noise preventing device 62 employed in a third embodiment of the wiper apparatus 60 of the present invention. FIG. 12A is a sectional view taken along the 12*a*-12*a* line of FIG. 11, and FIG. 12B is a sectional view taken along the 12*b*-12*b* line of FIG. 12.

The third embodiment of the wiper apparatus 60 is similar in construction to the second embodiment of the wiper apparatus 50, except that an arm piece 61 and the wind-noise preventing device 62 are employed in place of the arm piece 16 and wind-noise preventing device 51 of the second embodiment 50.

The arm piece 61 and wind-noise preventing device 62 are formed as a single plate by compressing a steel pipe. The arm piece 61 has a profile similar to that of the arm piece 16 of the second embodiment and different from the arm piece 16 only in that it is formed by compressing a steel pipe. Thus, of the arm piece 61, similar elements to those of the arm piece 16 are indicated by the same reference numerals as used for the arm piece 16 and will not be described here to avoid unnecessary duplication.

The wind-noise preventing device 62 has a shape similar to the wind-noise preventing device 51 of the second embodiment and different from the wind-noise preventing device 51 only in that it is formed by compressing a steel pipe. Thus, of the wind-noise preventing device 62, similar elements to those of the wind-noise preventing device 51 are indicated by the same reference numerals as used for the wind-noise preventing device 51 and will not be described here to avoid unnecessary duplication.

Similarly to the wind-noise preventing device 51 of the second embodiment, the wind-noise preventing device 62 is in the form of an arm piece extension member formed integrally with the fixation portion 38 of the arm piece 61. The wind-noise preventing device (arm piece extension member) 62 has a downward slanting portion 44 extending from the fixation portion 38 (one end of the arm piece 61), a horizontal portion 63 extending from one end 44*a* of the downward slanting portion 44, a hollow portion 64 extending from one end 63*a* of the horizontal portion 63, and a vertical portion (proximal-end-side portion) 65 extending from one end of the hollow portion 64.

The horizontal portion 63 extends from the lower end 44*a* of the downward slanting portion 44 in generally parallel relation to the front window glass 12. The horizontal portion 63 protrudes through the lower end of the opening portion 36 toward the front window glass 12, as shown in FIG. 12A. In the substantial front-rear direction of the vehicle body (i.e., in the substantial flowing direction of traveling wind), the horizontal portion 63 has a width oriented generally parallel to the front window glass 12, as seen in FIG. 12A.

The hollow portion 64 extends from the lower end 63*a* of the hollow portion 63 in generally parallel relation to the front window glass 12. The hollow portion 64 has a lower portion 64*a* protruding through the lower end of the opening portion 36 toward the front window glass 12, as shown in FIG. 12B.

The vertical portion 65 is oriented substantially vertically to the front window glass 12. Similarly to the pin-side part 56 of the second embodiment, the vertical portion 65 has a lower end 65*a* projecting through the lower end of the opening portion 36 toward the front window glass 12. The lower end 65*a* is held in proximity to the front window glass 12, and thus, there is no possibility of traveling wind flowing through a gap between the lower end 65*a* and the front window glass 12. The vertical portion 65 has a mounting hole 67 formed in a substantial middle region thereof, and the pin 28 is fitted through the mounting hole 67, as seen in FIG. 9C.

Namely, the vertical portion 65 is fixed via the pin 28 within the space 35 of the retainer 25, so that the wind-noise preventing device 62 can be fixed in place firmly.

With reference to FIGS. 12A and 12B, the following paragraphs describe how the wind-noise preventing device 62 functions to minimize or avoid production of wind noise. Traveling wind produced by traveling of the vehicle flows along the front window glass 12. Some component of the traveling wind, flowing along the front window glass 12, reaches the front side wall 31 of the retainer 25.

As shown in FIG. 12A, the horizontal portion 63 protrudes through the lower end of the opening portion 36 toward the front window glass 12. Thus, the traveling wind flows along the horizontal portion 63 as indicated by arrow B while being effectively prevented, by the protruding horizontal portion 63, from entering the distal-end-side space 35*a* through the opening portion 36. By the traveling wind being prevented from entering the distal-end-side space 35*a* like this, the wind-noise preventing device 62 can minimize or avoid production of undesired wind noise.

As shown in FIG. 12B, the lower portion 64*a* of the hollow portion 64 protrudes through the lower end of the opening portion 36 toward the front window glass 12. Thus, the traveling wind flows along the lower portion 64*a* of the hollow portion 64 as indicated by arrow D while being effectively prevented, by the protruding lower portion 64*a*, from entering the distal-end-side space 35*a* through the opening portion 36. By the traveling wind being prevented from entering the distal-end-side space 35*a* like this, the wind-noise preventing device 62 can minimize or avoid production of undesired wind noise.

In the above-described third embodiment of the wiper apparatus 60, where the vertical portion 65 is fixed in place within the space 35, the wind-noise preventing device 62 can be fixed firmly. In addition, the third embodiment of the wiper apparatus 60 can afford the same advantageous benefits as the second embodiment of the wiper apparatus 50.

Figure 13:
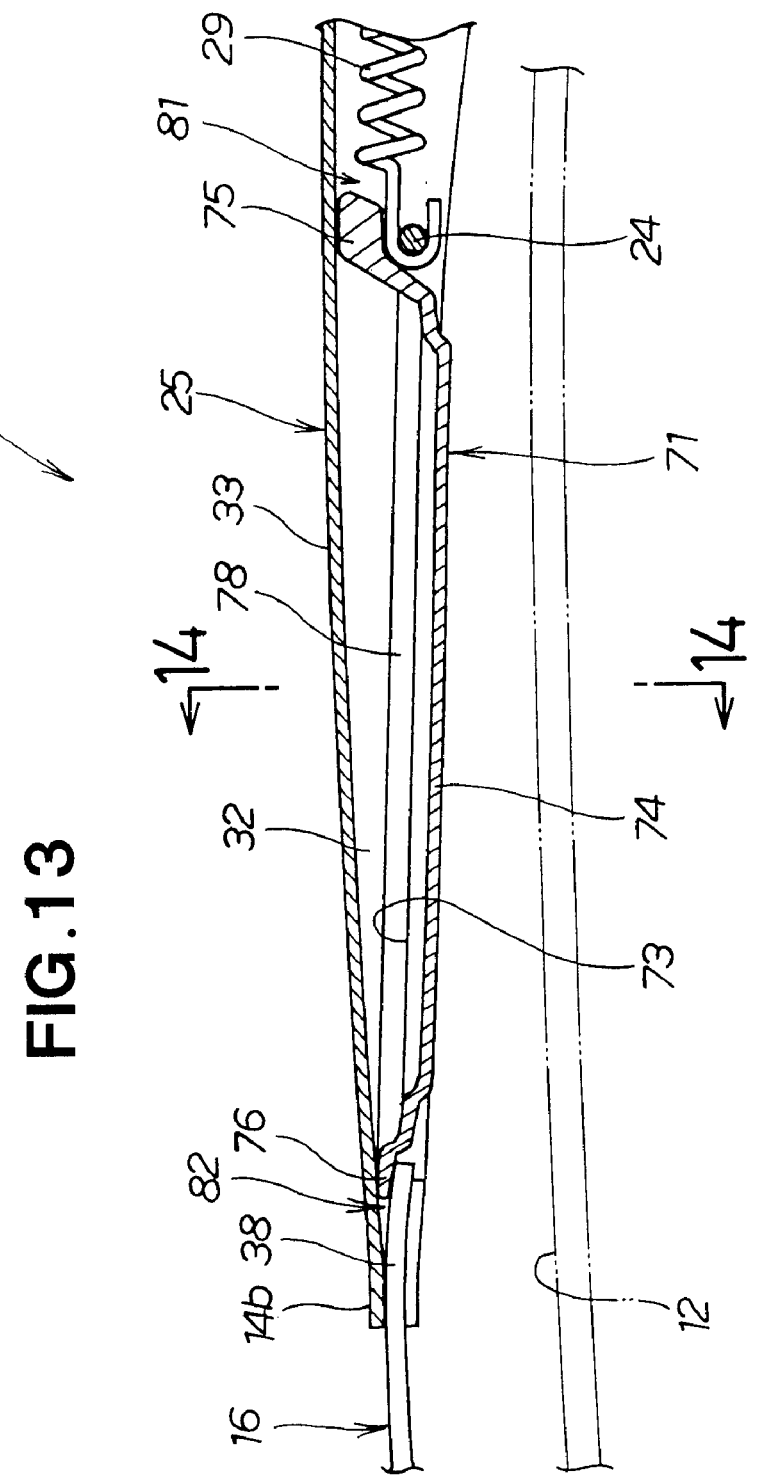
FIG. 13 is a sectional view showing a wind-noise preventing device (opening-covering member) employed in a fourth embodiment of the wiper apparatus of the present invention.
Figure 14:
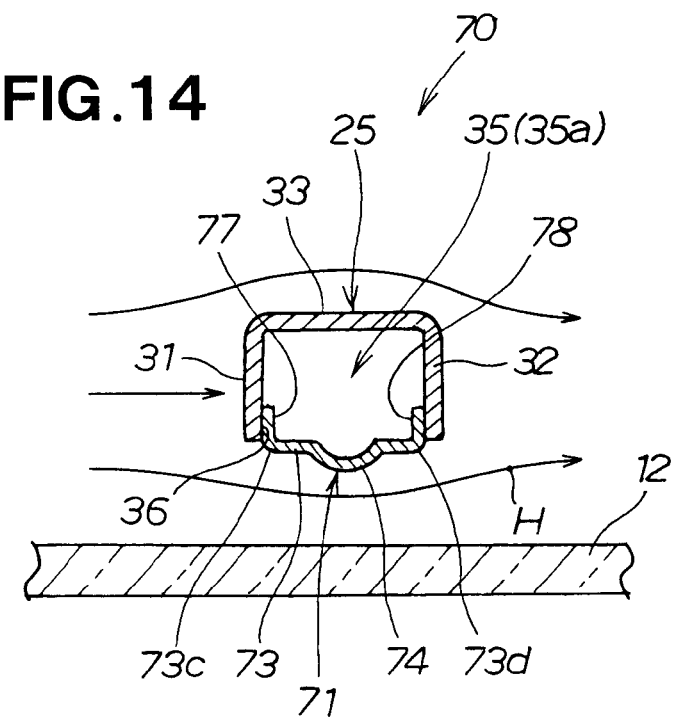
FIG. 14 is a sectional view taken along line 14-14 of FIG. 13.

FIG. 13 is a sectional view showing a wind-noise preventing device 71 employed in a fourth embodiment of the wiper apparatus 70 of the present invention. FIG. 14 is a sectional view taken along the 14-14 line of FIG. 13, and FIG. 15 is a perspective view of the wind-noise preventing device 71.

The fourth embodiment of the wiper apparatus 70 is similar in construction to the first embodiment of the wiper apparatus 10, except that the wind-noise preventing device 71 is provided in place of the wind-noise preventing device 20 of the first embodiment.

Figure 15:
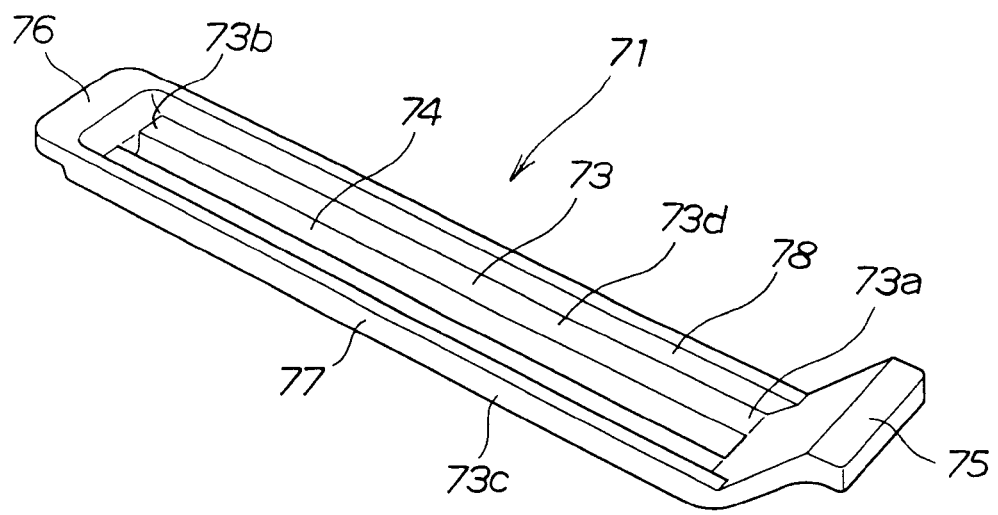
FIG. 15 is a perspective view showing the wind-noise preventing device in the fourth embodiment of the wiper apparatus.

As shown in FIG. 15, the wind-noise preventing device 71 is in the form of an elastically deformable opening-covering member having a rectangular bottom portion 73 with a reinforcing rib 74 formed centrally along its length. First engaging portion 75 is formed on a left end 73a of the bottom portion 73, and a second engaging portion 76 is formed on a right end 73b of the bottom portion 73. Front wall 77 is formed on a front side edge 73c of the bottom portion 73, and a rear wall 78 is formed on a rear side edge 73d of the bottom portion 73.

Namely, in the fourth embodiment, the wind-noise preventing device 71 is formed separately from the retainer 25 and arm piece 16.

As shown in FIG. 13, the first engaging portion 75 is a portion fittable in a first gap 81 between the tension spring 29 and the upper wall 33 of the retainer 25. The second engaging portion 76 is a portion fittable in a second gap 82 between the fixation portion 38 and the upper wall 33. With the first engaging portion 75 fitted in the first gap 81 and second engaging portion fitted in the second gap 82, the wind-noise preventing device (opening-covering member) 71 is mounted in the opening portion 36 of the retainer 25.

More specifically, as shown in FIG. 14, the front wall 77 of the wind-noise preventing device (opening-covering member) 71 is held in contact with the front side wall 31 of the retainer 25, while the rear wall 78 of the wind-noise preventing device 71 is held in contact with the rear side wall 32 of the retainer 25. Thus, the opening portion 36 can be covered with the wind-noise preventing device 71 over the entire width thereof (more specifically, over the entire interval between the front and rear side walls 31 and 32).

Because the wind-noise preventing device (opening-covering member) 71 is provided as a separate component part, it can be manufactured with an increased design (particularly, shape) freedom, and it can be formed so as to cover the entire width of the opening portion 36 (almost the entire opening portion 36). Because the opening portion 36 can be covered or hidden with the wind-noise preventing device 71, the wiper apparatus 70 can have an improved appearance as viewed from the interior of the compartment of the vehicle.

Further, as shown in FIG. 14, the bottom portion 73 of the wind-noise preventing device 71 is held in a protruding position where it protrudes beyond the opening portion 36 toward the front window glass 12. Furthermore, in the sectional view of FIG. 14 taken in the substantial front-rear direction of the vehicle body (i.e., in the substantial flowing direction of traveling wind), the bottom portion 73 has a width oriented generally parallel to the front window glass 12.

Figure 16A:
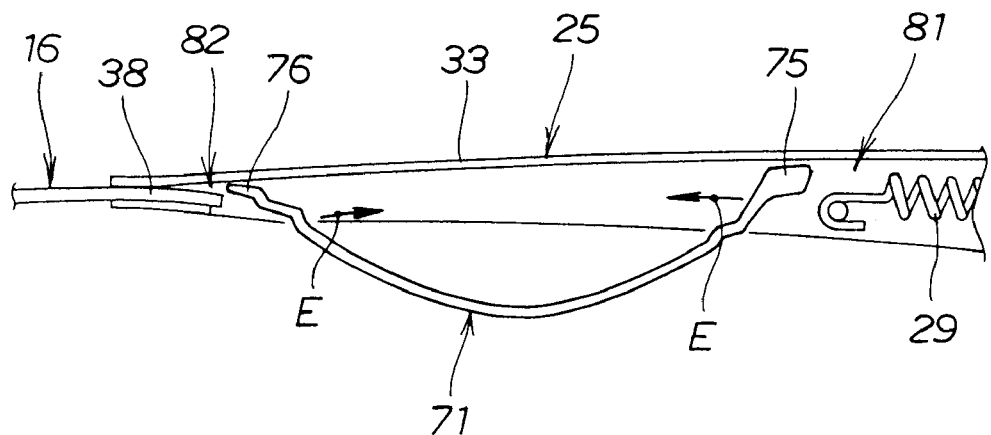
FIGS. 16A-16B are views explanatory of how the wind-noise preventing device is attached to an opening portion of a retainer in the fourth embodiment of the wiper apparatus.
Figure 16B:
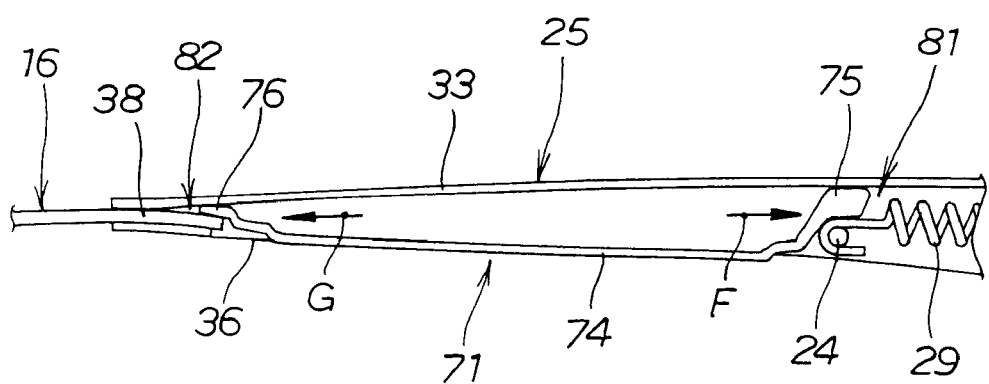

The wind-noise preventing device (opening-covering member) 71 is attached to the opening portion 36 of the retainer 25 in a manner as shown in FIGS. 16A and 16B.

First, pressing force is applied to the first and second engaging portions 75 and 76 to move the portions 75 and 76 toward each other as indicated by arrow E (FIG. 16A), so that the wind-noise preventing device (opening-covering member) 71 is elastically deformed into a curved shape. Then, the first and second engaging portions 75 and 76 are opposed to the first and second gaps 81 and 82, respectively.

Then, the pressing force is removed so as to restore the wind-noise preventing device 71 to the original shape, so that the first and second engaging portions 75 and 76 are fitted in the first and second gaps 81 and 82, respectively. In this manner, the wind-noise preventing device 71 can be attached to the opening portion 36 of the retainer 25.

Namely, because the wind-noise preventing device 71 is an elastically deformable member, it can be readily attached to the opening portion 36 of the retainer 25 by being just elastically deformed into a suitable shape and then restored to the original shape, as seen from FIGS. 16A and 16B.

With reference to FIG. 14, the following paragraphs describe how the wind-noise preventing device (opening-covering member) 71 functions to minimize or avoid production of undesired wind noise. Traveling wind produced by traveling of the vehicle flows along the front window glass 12. Some component of the traveling wind, flowing along the front window glass 12, reaches the front side wall 31 of the retainer 25.

Because the bottom portion 73 of the wind-noise preventing device 71 is positioned to protrude beyond the opening portion 36 toward the front window glass 12, the traveling wind flows along the bottom portion 73 as indicated by arrow H while being effectively prevented, by the protruding bottom portion 73, from entering the distal-end-side space 35a through the opening portion 36. By the traveling wind being prevented from entering the distal-end-side space 35a like this, the wind-noise preventing device 71 can minimize or avoid production of undesired wind noise.

In the above-described fourth embodiment of the wiper apparatus 70, where the wind-noise preventing device (opening-covering member) 71 is formed separately from the retainer 25 and arm piece 16, it can be manufactured with an increased design (particularly, shape) freedom. Thus, the wind-noise preventing device 71 can be shaped to appropriately cover the entire opening portion 36. Because the opening portion 36 can be hidden with the wind-noise preventing device 71, the wiper apparatus 70 can have an improved appearance as viewed from the interior of the compartment of the vehicle. In addition, the fourth embodiment of the wiper apparatus 70 can afford the same advantageous benefits as the first embodiment of the wiper apparatus 10.

It should be noted that the wind-noise preventing devices 20, 51, 62 and 71 are not limited to the above-described shapes and may be modified in accordance with the construction of the wiper apparatus in question.

The present invention is well suited for use in automotive vehicles provided with a wiper apparatus for wiping a window glass of the vehicle with a wiper blade.

What is claimed is:

1. A wiper apparatus for wiping a window glass of a vehicle by means of a wiper blade, said wiper apparatus comprising:
   an arm shank pivotably supported at a proximal end portion thereof on the vehicle near the window glass, said arm shank having an opening portion opposed to the window glass and an inner space located inwardly of the opening portion;
   an arm piece mounted to a distal end portion of said arm shank and having the wiper blade attached thereto; and
   wind-noise preventing means provided between said arm piece and the proximal end portion of said arm shank and having a protrusion portion protruding through the opening portion toward the window glass so as to prevent an air flow, produced by traveling of the vehicle, from entering the inner space through the opening portion, and a proximal end portion extending from the protrusion portion through the opening portion into the inner space, wherein the proximal end portion of said wind-noise preventing means partitions off the inner space into a distal-end-side space and a proximal-end-side space,
wherein said arm shank further has a connection member spaced from the proximal end portion of the arm shank, wherein said wiper apparatus further comprises a biasing member having a first end connected to the proximal end portion of the arm shank and a second end connected to the connection member, and wherein the proximal end portion of the wind-noise preventing means extends toward the distal end portion of the arm shank away from the connection member to a fixation portion which engages an upper wall of the arm shank.

2. The wiper apparatus of claim 1, wherein said wind-noise preventing means is provided generally parallel to the window glass.

3. The wiper apparatus of claim 1, wherein said wind-noise preventing means is an arm piece extension member formed integrally with said arm piece and extending from said arm piece toward the proximal end portion of said arm shank.

4. The wiper apparatus of claim 3, wherein said arm piece extension member has a proximal-end-side end portion adjoining the proximal end portion of said arm shank, the proximal-end-side end portion extending from the protrusion portion through the opening portion into the inner space.

5. The wiper apparatus of claim 4, wherein the proximal-end-side end portion of said arm piece extension member is a free end portion.

6. The wiper apparatus of claim 4, wherein the proximal-end-side end portion of said arm piece extension member is fixed at an end thereof within the inner space to the biasing member.

7. The wiper apparatus of claim 6, wherein said wind-noise prevention means includes a downward slanting portion extending from said arm piece, and a horizontal portion extending from said downward slanting portion to protrude through a lower end of said opening portion of said arm shank toward the window glass, wherein said horizontal portion includes a first part which is oriented generally parallel to the window glass and a second part which is oriented generally vertical to the window glass.

8. The wiper apparatus of claim 7, wherein said horizontal portion further includes a generally tubular portion interposed between the first part and the second part.

9. The wiper apparatus of claim 7, wherein said wind-noise preventing means is an arm piece extension member formed integrally with said arm piece and extending from said arm piece toward the proximal end portion of said arm shank, wherein said arm piece extension member has a proximal-end-side end portion adjoining the proximal end portion of said arm shank, the proximal-end-side end portion extending from the protrusion portion through the opening portion into the inner space, and wherein the proximal-end-side end portion of said arm piece extension member is a free end portion.

10. The wiper apparatus of claim 1, wherein said wind-noise prevention means has a width smaller than a distance between front and rear side walls of said arm shank to define gaps between said wind-noise prevention means and the front side wall and the rear side wall.

11. The wiper apparatus of claim 10, wherein said wind-noise prevention means including a downward slanting portion extending from said arm piece, a horizontal portion extending from said downward slanting portion to protrude through a lower end of said opening portion of said arm shank toward the window glass, and an upward slanting portion extending from said horizontal portion into said inner space of said arm shank.

12. The wiper apparatus of claim 11, wherein said upward slanting portion partitions off said inner space of said arm shank into the distal-end-side space and the proximal-end-side space, said wind-noise prevention means preventing air flow from entering the distal-end-side space.

13. A wiper apparatus for wiping a window glass of a vehicle by means of a wiper blade, said wiper apparatus comprising:
an arm shank pivotably supported at a proximal end portion thereof on the vehicle near the window glass, said arm shank having an opening portion opposed to the window glass and an inner space located inwardly of the opening portion, said arm shank further having a connection member spaced from the proximal end portion;
a biasing member having a first end connected to the proximal end portion of said arm shank and a second end connected to said connection member;
an arm piece mounted to a distal end portion of said arm shank and having the wiper blade attached thereto; and
wind-noise preventing means provided between said arm piece and the proximal end portion of said arm shank and having a protrusion portion protruding through the opening portion toward the window glass so as to prevent an air flow, produced by traveling of the vehicle, from entering the inner space through the opening portion,
wherein said wind-noise preventing means is an opening-covering member formed separately from said arm shank and said arm piece and attached to the opening portion to cover the opening portion, said opening-covering member includes a first engaging portion formed on a proximal end portion and a second engaging portion formed on a distal end portion, the first engaging portion being secured in a first gap between said connection member and an upper wall of said arm shank, the second engaging portion being secured in a second gap between said arm piece and the upper wall of said arm shank.

14. The wiper apparatus of claim 13, wherein said opening-covering member is an elastically deformable member.

15. A wiper apparatus for wiping a window glass of a vehicle by means of a wiper blade, said wiper apparatus comprising:
an arm shank pivotably supported at a proximal end portion thereof on the vehicle near the window glass, said arm shank having an opening portion opposed to the window glass and an inner space located inwardly of the opening portion;
a unitary one-piece arm piece mounted within and to a distal end portion of said arm shank and extending therefrom, said arm piece having the wiper blade attached thereto; and
wind-noise preventing means provided between said arm piece and the proximal end portion of said arm shank and having a protrusion portion protruding through the opening portion toward the window glass so as to prevent an air flow, produced by traveling of the vehicle, from entering the inner space through the opening portion, wherein said wind-noise preventing means is an arm piece extension member extending from said arm piece toward the proximal end portion of said arm shank, wherein said arm piece extension member has a proximal-end-side end portion adjoining the proximal end portion of said arm shank, the proximal-end-side end portion extending from the protrusion portion through the opening portion into the inner space, wherein the proximal-end-side end portion of said arm piece extension member is fixed at an end thereof within the inner space to a biasing member, and wherein said wind-noise prevention means includes a downward slanting portion in direct contact with and extending from said arm piece, and a horizontal portion extending from said downward slanting portion to protrude through a lower end of said opening portion of said arm shank toward the window glass, wherein said horizontal portion includes a first part which is oriented generally parallel to the window glass and a second part which is oriented generally vertical to the window glass.

16. The wiper apparatus of claim 15, wherein said horizontal portion further includes a generally tubular portion interposed between the first part and the second part.

* * * * *